US005640601A

United States Patent [19]
Peters

[11] Patent Number: 5,640,601
[45] Date of Patent: Jun. 17, 1997

[54] APPARATUS AND METHOD FOR INDEXING FRAMES AS THE IMAGES ARE BEING COMPRESSED USING SIGNAL FROM DATA DIGITIZER TO NOTIFY HOST UNIT AT EVERY FRAME

[75] Inventor: Eric C. Peters, Carlisle, Mass.

[73] Assignee: Avid Technology, Inc., Tewksbury, Mass.

[21] Appl. No.: 589,301

[22] Filed: Jan. 22, 1996

Related U.S. Application Data

[62] Division of Ser. No. 234,713, Apr. 28, 1994, Pat. No. 5,513,375, which is a continuation of Ser. No. 807,269, Dec. 13, 1991, abandoned.

[51] Int. Cl.$^6$ .................. H04N 5/14; G06F 3/05; G06F 3/14
[52] U.S. Cl. .................. 395/854; 348/715; 395/872; 395/501; 386/112
[58] Field of Search .................. 395/600, 872, 395/161, 162, 139, 250, 854; 358/160, 342; 348/715

[56] References Cited

U.S. PATENT DOCUMENTS

| | | | |
|---|---|---|---|
| 3,875,329 | 4/1975 | Nagel | 348/463 |
| 4,195,317 | 3/1980 | Stratton | 386/69 |
| 4,257,063 | 3/1981 | Loughry | 348/155 |
| 4,295,154 | 10/1981 | Hata | 386/25 |
| 4,538,188 | 8/1985 | Barker | 386/54 |
| 4,567,532 | 1/1986 | Baer | 386/117 |
| 4,685,003 | 8/1987 | Westland | 386/52 |
| 4,688,016 | 8/1987 | Fok | 341/59 |
| 4,689,683 | 8/1987 | Efron | 348/722 |
| 4,714,962 | 12/1987 | Levine | 348/64 |
| 4,717,971 | 1/1988 | Sawyer | 360/69 |
| 4,755,889 | 7/1988 | Schwartz | 386/34 |
| 4,777,537 | 10/1988 | Veno | 386/101 |
| 4,816,901 | 3/1989 | Music | 348/391 |
| 4,847,677 | 7/1989 | Music | 348/391 |
| 4,855,813 | 8/1989 | Russell | 348/559 |
| 4,894,789 | 1/1990 | Yee | 348/552 |
| 4,918,523 | 4/1990 | Simon | 348/396 |
| 4,924,303 | 5/1990 | Brandon | 348/7 |
| 4,963,995 | 10/1990 | Lang | 386/54 |
| 4,970,663 | 11/1990 | Bedell | 395/139 |
| 5,057,932 | 10/1991 | Lang | 386/101 |
| 5,133,079 | 7/1992 | Ballantyne | 455/4.1 |
| 5,138,459 | 8/1992 | Roberts | 348/232 |
| 5,153,726 | 10/1992 | Billing | 358/160 |
| 5,218,672 | 6/1993 | Morgan et al. | 395/162 |
| 5,253,078 | 10/1993 | Balkanski | 358/426 |
| 5,270,831 | 12/1993 | Parulski | 358/403 |
| 5,307,456 | 4/1994 | MacKay | 395/328 |
| 5,384,667 | 1/1995 | Beckwith | 386/55 |
| 5,396,339 | 3/1995 | Stern et al. | 358/342 |
| 5,519,828 | 5/1996 | Rayner | 395/161 |

FOREIGN PATENT DOCUMENTS

| | | |
|---|---|---|
| 0404399 | 12/1990 | European Pat. Off. . |
| 424903 A2 | 2/1991 | European Pat. Off. . |
| 0123377 | 1/1989 | Japan . |
| WO86/01631 | 3/1986 | WIPO . |

OTHER PUBLICATIONS

Introducing Win/TV–Celebrity Advanced Features, product announcement, dated 1991 and Apr. 1994.
Ades, Stephen and Swinehart, Daniel C., "Voice Annotation and Editing in a Workstation Environment", 1986, Xerox Palo Alto Research Center, Voice I/O Systems Applications Conference, 16–18 Sep. 1986, pp. 13–28.

Primary Examiner—Thomas C. Lee
Assistant Examiner—D. Dinh
Attorney, Agent, or Firm—Wolf, Greenfield & Sacks, P.C.

[57] ABSTRACT

A data buffer that compensates the differences in data rates, between a storage device and an image compression processor. A method and apparatus for the real time indexing of frames in a video data sequence.

32 Claims, 3 Drawing Sheets

APPARATUS AND METHOD FOR INDEXING FRAMES AS THE IMAGES ARE BEING COMPRESSED USING SIGNAL FROM DATA DIGITIZER TO NOTIFY HOST UNIT AT EVERY FRAME

This application is a division of application Ser. No. 08/234,713, filed Apr. 28, 1994, now U.S. Pat. No. 5,513, 375, which is a continuation application of prior application Ser. No. 07/807,269, filed Dec. 13, 1991, entitled BUFFER AND FRAME INDEXING, now abandoned.

BACKGROUND OF THE INVENTION

This invention relates to hardware designs coupled with software-based algorithm for capture, compression, decompression, and playback of digital image sequences, particularly in an editing environment.

The idea of taking motion video, digitizing it, compressing the digital datastream, and storing it on some kind of media for later playback is not new. RCA's Sarnoff labs began working on this in the early days of the video disk, seeking to create a digital rather than an analog approach. This technology has since become known as Digital Video Interactive (DVI).

Another group, led by Phillips in Europe, has also worked on a digital motion video approach for a product they call CDI (Compact Disk Interactive). Both DVI and CDI seek to store motion video and sound on CD-ROM disks for playback in low cost players. In the case of DVI, the compression is done in batch mode, and takes a long time, but the playback hardware is low cost. CDI is less specific about the compression approach, and mainly provides a format for the data to be stored on the disk.

A few years ago, a standards-making body known as CCITT, based in France, working in conjunction with ISO, the International Standards Organization, created a working group to focus on image compression. This group, called the Joint Photographic Experts Group (JPEG) met for many years to determine the most effective way to compress digital images. They evaluated a wide range of compression schemes, including vector quantization (the technique used by DVI) and DCT (Discrete Cosine Transform). After exhaustive qualitative tests and careful study, the JPEG group picked the DCT approach, and also defined in detail the various ways this approaach could be used for image compression. The group published a proposed ISO standard that is generally referred to as the JPEG standard. This standard is now in its final form, and is awaiting ratification by ISO, which is expected.

The JPEG standard has wide implications for image capture and storage, image transmission, and image playback. A color photograph can be compressed by 10 to 1 with virtually no visible loss of quality. Compression of 30 to 1 can be achieved with loss that is so minimal that most people cannot see the difference. Compression factors of 100 to 1 and more can be achieved while maintaining image quality acceptable for a wide range of purposes.

The creation of the JPEG standard has spurred a variety of important hardware developments. The DCT algorithm used by the JPEG standard is extremely complex. It requires converting an image from the spatial domain to the frequency domain, the quantization of the various frequency components, followed by Huffman coding of the resulting components. The conversion from spatial to frequency domain, the quantization, and the Huffman coding are all computationally intensive. Hardware vendors have responded by building specialized integrated circuits to implement the JPEG algorithm.

One vendor, C-Cube of San Jose, Calif., has created a JPEG chip (the CL550B) that not only implements the JPEG standard in hardware, but can process an image with a resolution of, for example, 720×488 pixels (CCIRR 601 video standard) in just 1/30th of a second. This means that the JPEG algorithm can be applied to a digitized video sequence, and the resulting compressed data can be stored for later playback. The same chip can be used to compress or decompress images or image sequences. The availability of this JPEG chip has spurred computer vendors and system integrators to design new products that incorporate the JPEG chip for motion video. However, the implementation of the chip in a hardware and software environment capable of processing images with a resolution of 640×480 pixels or greater at a rate of 30 frames per second in an editing environment introduces multiple problems.

For high quality images, a data size of 15–40 Kbytes per frame is needed for images at 720×488 resolution. This means that 30 frames per second video will have a data rate of 450 to 1200 Kbytes per second. For data coming from a disk storage device, this is a high data rate, requiring careful attention to insure a working system.

The most common approach in prior systems for sending data from a disk to a compression processor is to copy the data from disk into the memory of the host computer, and then to send the data to the compression processor. In this method, the computer memory acts as a buffer against the different data rates of the compression processor and the disk. This scheme has two drawbacks. First, the data is moved twice, once from the disk to the host memory, and another time from the host memory to the compression processor. For a data rate of 1200 Kbytes per second, this can seriously tax the host computer, allowing it to do little else but the data copying. Furthermore, the Macintosh computer, for example, cannnot read data from the disk and copy data to the compression processor at the same time. The present invention provides a compressed data buffer specifically designed so that data can be sent directly from the disk to the buffer.

With the JPEG algorithm, as with many compression algorithms, the amount of data that results from compressing an image depends on the image itself. An image of a lone seagull against a blue sky will take much less data than a cityscape of brick buildings with lots of detail. Therefore, it becomes difficult to know where a frame starts within a data file that contains a sequence of frames, such as a digitized and compressed sequence of video. This creates particular problems in the playback from many files based on edit decisions. With fixed size compression approaches, one can simply index directly into the file by multiplying the frame number by the frame size, which results in the offset needed to start reading the desired frame. When the frame size varies, this simple multiplication approach no longer works. One needs to have an index that stores the offset for each frame. Creating this index can be time consuming. The present invention provides an efficient indexing method.

SUMMARY OF THE INVENTION

The data buffer of the invention compensates for the data rate differences between a storage device and the data compression processor of a digital image compression and playback unit. The data buffer interfaces to a host central processing unit, a storage device, a DMA address register, and a DMA limit register, and is mapped into the address space of the host computer bus. The data sequence is unloaded from the storage device into the data buffer, which is twice mapped into the address space of the host computer.

DESCRIPTION OF THE PREFERRED EMBODIMENT

Figure 1:
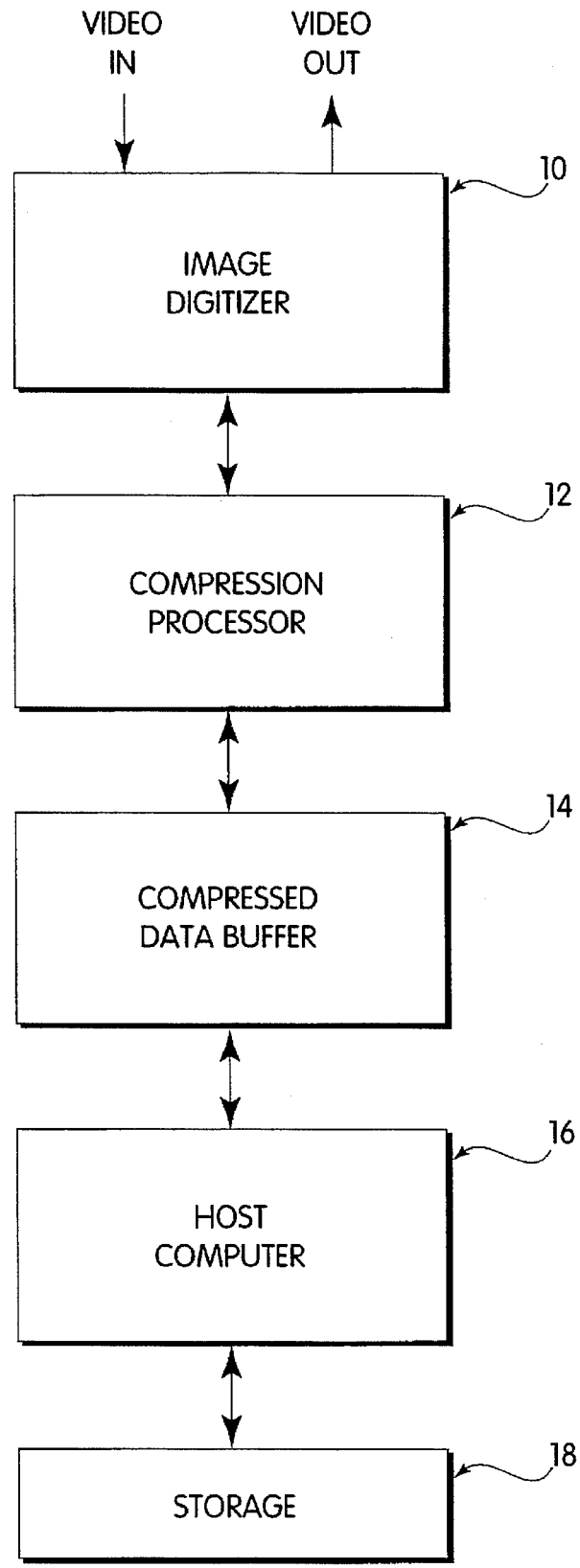
FIG. 1 is a block diagram of a video image capture and playback system implementing data compression.

A block diagram according to a preferred embodiment of a system for capture, compression, storage, decompression, and playback of images is illustrated in FIG. 1.

As shown, an image digitizer (frame grabber) 10, captures and digitizes the images from an analog source, such as videotape. Image digitizer 10 may be, for example, a TrueVision NuVista+board. However, the NuVista+board is preferably modified and augmented with a pixel engine as described "Image Digitizer Including Pixel Engine" by B. Joshua Rosen et at., filed Dec. 13, 1991, to provide better data throughput for a variety of image formats and modes of operation. Other methods of acquiring digitized video frames may be used, e.g., direct capture of digital video in "D-1" or "D-2" digital video formats.

A compression processor 12 compresses the data according to a compression algorithm. Preferably, this algorithm is the JPEG algorithm, introduced above. As discussed above, C-Cube produces a compression processor (CL550B) based on the JPEG algorithm that is appropriate for use as the compression processor 12. However, other embodiments are within the scope of the invention. The compression processor 12 may be a processor that implements the new MPEG (Motion Picture Experts Group) algorithm, or a processor that implements any of a variety of other image compression algorithms known to those skilled in the art.

The compressed data from the processor 12 is preferably input to a compressed data buffer 14 which is interfaced to a host computer 16 connected to a disk 18. The compressed data buffer 14 preferably implements a DMA process in order to absorb speed differences between the compression processor 12 and the disk 18, and further to permit data transfer between the processor 12 and the disk 18 with a single pass through a CPU of the host computer 16. (The details of the compressed data buffer 14 according to the present invention will be presented hereinbelow.) The host computer 16 may be, for example, an Apple Macintosh.

Buffer

As discussed above, a compressed data buffer is provided to take up the data rate differences between the disk 18 and the data compression processor 12. In this way, data can be sent directly from the disk to the buffer, or vice versa, passing through the host CPU only once. One thus avoids copying the data from the compression hardware into the host's main memory before it can be written from there to the disk storage subsystem. This scheme cuts the CPU overhead in half, doubling data throughput.

Figure 2:
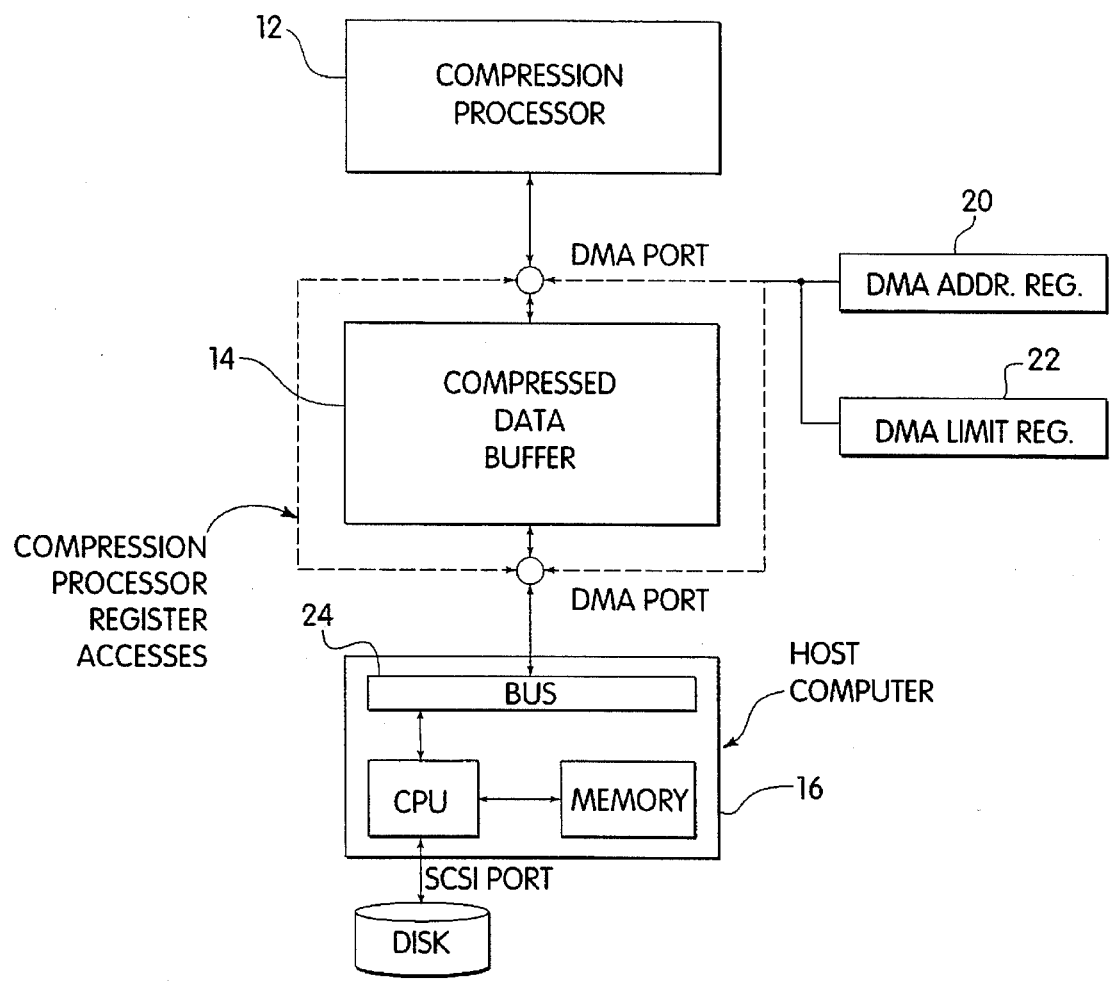
FIG. 2 is a schematic diagram of a compressed data buffer according to one embodiment of the invention.

A detailed schematic diagram of the storage end of the system of FIG. 1 is shown in FIG. 2. The compressed data buffer 14 is addressable. Associated with the buffer 14 are a DMA address register 20 and a DMA limit register 22. These registers and the buffer are seen by a CPU bus 24 of the host computer 16. Because the buffer 14 is addressable, standard file system calls can be used to request that the host computer 16 read data from the disk 18 and send it to the buffer 14, or read data from the buffer 14 and send it to the disk 18. The buffer 14 looks to the computer 16 like an extension of its own memory. No changes to the host computer disk read or write routines are required. For example, a single call to the operating system 16 of the host computer specifying a buffer pointer, a length to read, and a destination of the disk will effect a direct transfer of data from the buffer to the disk. By looking at the DMA address at the JPEG buffer, one can tell when the data is ready. By setting the DMA limit, feedback throttles the JPEG processor filling the buffer.

According to the invention, the buffer 14 is mapped in an address space of the host computer's bus 24 twice. Thus, the buffer is accessible in two contiguous locations. This has important ramifications in an editing environment during playback.

Figure 3:
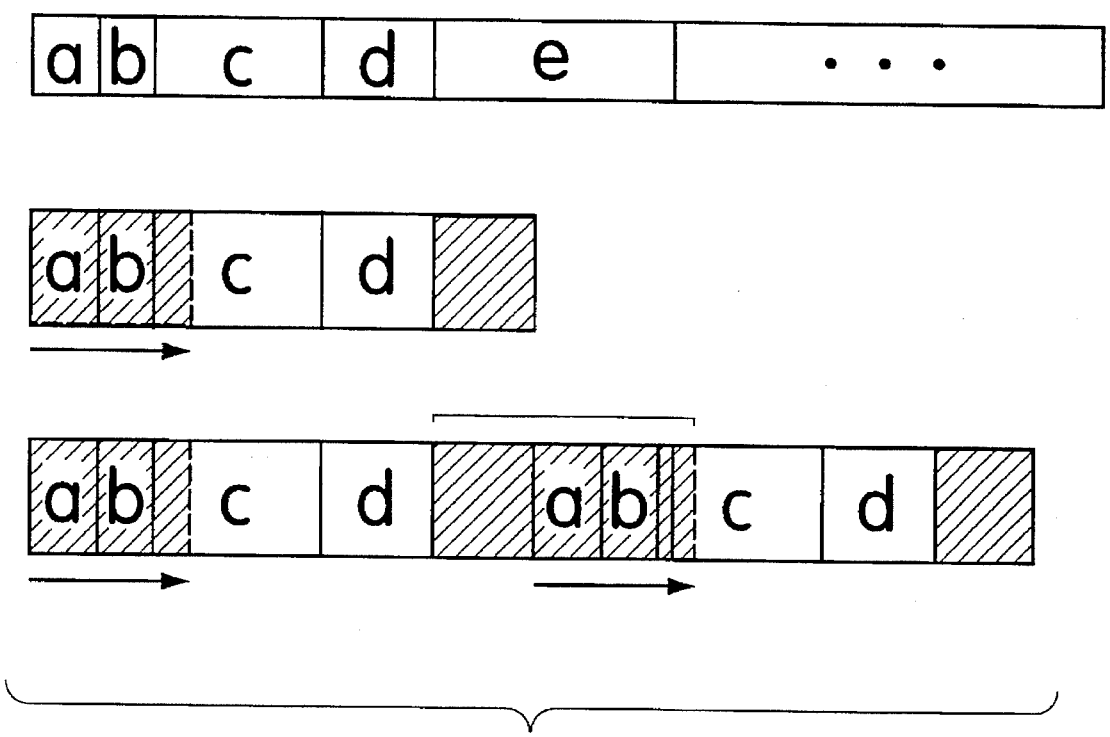
FIG. 3 is a schematic illustration of an edited sequence of images along with two mapping schemes of the compressed data buffer in the host system's bus.

FIG. 3 shows an edited sequence of images and a representation of a buffer that is mapped to the address space of the host computer's bus only once. The sequence is longer than the buffer. Each edit point in the sequence represents a point at which the data must be picked up at a new place on the disk.

During playback, the sequence will be read into the buffer from left to right, and the buffer will empty from left to right as the images are played. In the example illustrated, segments a, b, c and d fit into the buffer. Segment e does not however. For the buffer shown, therefore, two reads will be required to transfer segment e, since part of e will go at the end of the buffer, and the rest will go at the beginning of the buffer, as the beginning empties during playback. It is desirable to limit the number of reads as much as possible, as reads reduce the throughput of the system. The longer the reads, the more efficient the system.

This problem can be largely eliminated by mapping the buffer into the address space of the host computer's bus twice. As illustrated in FIG. 3, segment e now fits in contiguous memory in the buffer by overflowing into the second mapping. In this example, then, the double-mapping has allowed a single read, where two reads would have been required before. In general, for every read, you can read as much as is empty in the buffer. The space in the second mapping is only temporarily borrowed. In practice, the scheme is implemented by making the address of the second mapping the same as the address of the first except for a single bit, and by having the hardware of the system ignore this bit. So whether data is written to the first mapping or the second, it goes to the same place in the buffer.

This double mapping solves an important problem in a way that would not be possible without the buffer, since the computer's memory itself cannot in general be remapped to mimic the technique.

Frame Indexing

For any data compression scheme that results in compressed images with variable frame size, a method of frame indexing is required for finding frames to put together an edited sequence. The location of any frame is preferably instantly available.

The C-Cube chip described above provides a mechanism for creating an index by allowing the user to specify that a marker code be placed at a specified location in every frame.

Therefore, a marker code can be placed at the beginning or end of every frame. In prior approaches, a program has been written to sequentially scan the file containing a sequence of images on a disk, and find and remember the location of each marker code. This is a post processing approach and is time consuming.

According to the frame indenting method of the invention, the image digitizer is programmed to generate an interrupt to the CPU of the host computer at every frame.[1] As the compression processor is putting data in the compressed data buffer, each time the CPU detects an interrupt it notes the location of the pointer in the buffer. By keeping track of the number of times the pointer has been through the memory, and the number of bytes the pointer is into the memory at each interrupt, the CPU can keep a table in memory of the position, or more preferably, the length of each frame. This table can be dumped to the disk at the end of the file, thereby providing the location of every frame in the file.

[1] Another prior approach is to use a fast processor or special purpose hardware to recognize and record the position of the marker code on the fly.

The table of frame locations does not solve all problems, however. Retrieving this information as needed during playback of an editted sequence is prohibitively time consuming. The solution is to make only that information necessary for a given edited sequence available to the CPU. The required information is the beginning and end of each segment of the sequence.

According to the invention, a data structure representing an edited sequence is generated at human interaction time during the editing process. Each time a user marks an edit point, an item is added to the list. By including in the list two fields representing the locations of the beginning of first and end of last frames in a segment, this information will be readily available at playback time. Since this prefetching of index values occurs during human interaction time, it does not create a bottleneck in the system.

The CPU can also be alerted whenever the frame sizes are getting too large for the system to handle. Compensating mechanisms can be triggered into action. One example of such a mechanism is the quality adjustment method disclosed in copending application "Quantization Table Adjustment" by Eric C. Peters filed Dec. 13, 1991. This adjustment reduces frame size (at the expense of quality).

It will be clear to those skilled in the art that a buffer according to the invention can be simply designed using programmable array logic and memory chips.

What is claimed is:

1. A method for indexing a sequence of images, the method comprising steps of:

sending a signal to a central processing unit of a host computer for every image using a data digitizer;

compressing digital data received from the data digitizer using a compression processor;

transferring compressed data from the compression processor to a compressed data buffer;

transferring compressed data from the compressed data buffer into a computer-readable random access medium using the central processing unit of the host computer;

determining a length of the compressed data for each image as a function of the signal received from the data digitizer using the central processing unit of the host computer: and recording a location of each image in the random access medium as a function of the determined length of the compressed data.

2. A method for capturing motion video as compressed image data defining a sequence of computer-readable still images stored in a data file on a computer-readable random access medium, the method comprising the steps of:

receiving the motion video as a sequence of digitized still images defined by digital image information;

generating an image indicator signal for each digitized still image as the digitized still image is received:

compressing the digital image information of each digitized still image to provide corresponding compressed image data;

storing the corresponding compressed image data in a buffer as the digital image information is compressed;

for each digitized still image, determining a length of the corresponding compressed image data in the buffer as a function of the image indicator signal while each digitized still image is being compressed;

reading the corresponding compressed image data of each digitized still image from the buffer into the data file on the computer-readable random access medium; and storing, in association with the data file, an index of each digitized still image according to the determined length of the corresponding compressed image data of each digitized still image stored in the data file.

3. The method of claim 2, wherein the step of determining the size of the compressed image data includes the step of monitoring the step of storing.

4. The method of claim 2, wherein the step of generating the image indicator signal comprises the step of:

sending an interrupt to a central processing unit at an end of every digitized still image; and the step of determining the length of the compressed image data comprises the step of the central processing unit storing, in a table, a location of a pointer in the buffer when the interrupt is received, a number of bytes into the buffer and a number of times through the buffer for each digitized still image; and wherein the step of storing the index comprises the step of:

the central processing unit dumping the table into the data file containing the corresponding compressed image data.

5. The method of claim 2, wherein each still image is a frame of the motion video.

6. The method of claim 2, wherein each still image is a field of the motion video.

7. The method of claim 2, wherein the step of receiving comprises the steps of:

receiving the motion video as an analog video signal defining the sequence of still images; and digitizing each still image to obtain the digital image information.

8. The method of claim 7, wherein the steps of digitizing, compressing and storing are performed in real time as the analog video signal is received.

9. The method of claim 2, further comprising a step of editing a video program using the indexed still images of the motion video, the step of editing comprising the steps of:

selecting a portion of the data file for use in the video program, wherein the selected portion has a first still image and a last still image, and wherein each still image has a beginning and an end in the data file; and storing, for the selected portion, an indicator of a location of the beginning of the first still image and an indicator of a location of the end of the last still image of the selected portion using the index stored in the data file.

10. The method of claim 2, wherein the step of generating the image indicator signal includes a step of sending the image indicator signal at an end of each still image; and the step of determining the length of the compressed image data comprises the step of counting a number of bytes transferred into the buffer since a previous image indicator signal was received.

11. The method of claim 10, wherein the step of determining the length of the compressed image data further comprises the steps of:

upon receipt of the previous image indicator signal, determining a location of a pointer in the buffer and determining a number of times the pointer moves through the buffer until receipt of a next image indicator signal.

12. The method of claim 2, wherein the step of generating the image indicator signal comprises the step of sending the image indicator signal to a central processing unit; and the step of determining the length of the compressed image data comprises the step of the central processing unit determining the length of the compressed image data as a function of the image indicator signal.

13. The method of claim 12, wherein the step of storing the corresponding compressed image data in the buffer comprises the step of outputting a location of a pointer in the buffer; and the step of determining the length of the compressed image data further comprises the step of the central processing unit determining the length of the compressed image data as a function of a value of the location of the pointer in the buffer when the image indicator signal is received by the central processing unit.

14. The method of claim 2, wherein the step of generating the image indicator signal comprises the step of sending an interrupt to a central processing unit at an end of every still image; and the step of determining the length of the compressed image data comprises the step of the central processing unit counting a number of bytes transferred into the buffer since a previous interrupt was received.

15. The method of claim 14, wherein the step of storing the corresponding compressed image data in the buffer comprises the step of outputting a location of a pointer in the buffer; and the step of counting the number of bytes transferred into the buffer comprises the step of determining a number of times the pointer moves through the buffer until receipt of a next interrupt.

16. An apparatus for capturing motion video as compressed image data defining a sequence of computer-readable still images stored in a data file on a computer-readable random access medium, comprising:

means for receiving the motion video as a sequence of digitized still images defined by digital image information;

means for generating an image indicator signal for each digitized still image as the digitized still image is received:

means for compressing the digital image information of each digitized still image to provide corresponding compressed image data;

a buffer for storing the corresponding compressed image data as the digital image information is compressed;

means for determining, for each digitized still image, a length of the corresponding compressed image data in the buffer as a function of the image indicator signal;

means for reading the corresponding compressed image data of each digitized still image from the buffer into the data file on the computer-readable random access medium; and means for storing an index of each digitized still image in association with the data file and according to the determined length of the corresponding compressed image data of each digitized still image stored in the data file.

17. The apparatus of claim 16, wherein the means for determining the size of the compressed image data includes means for monitoring the buffer.

18. The apparatus of claim 16, wherein the means for generating the image indicator signal comprises:

means for generating an interrupt to a central processing unit at an end of every digitized still image; and the central processing unit including means for storing, in a table, a location of a pointer in the buffer when the interrupt is received, a number of bytes into the buffer and a number of times through the buffer for each digitized still image; and wherein the means for storing the index comprises:

in the central processing unit, means for dumping the table into the data file containing the corresponding compressed image data.

19. The apparatus of claim 16, wherein each still image is a frame of the motion video.

20. The apparatus of claim 16, wherein each still image is a field of the motion video.

21. The apparatus of claim 16, wherein the means for receiving comprises:

means for receiving the motion video as an analog video signal defining the sequence of still images; and a frame grabber for capturing and digitizing each still image to obtain the digital image information.

22. The apparatus of claim 21, wherein the frame grabber, means for compressing and means for reading operate in real time as the analog video signal is received.

23. The apparatus of claim 16, further comprising means for editing a video program using the indexed still images of the motion video, comprising:

means for selecting a portion of the data file for use in a video program, wherein the selected portion has a first still image and a last still image, and wherein each still image has a beginning and an end in the data file; and means for storing, for the selected portion, an indicator of a location of the beginning of the first still image and an indicator of a location of the end of the last still image of the selected portion using the index stored in the data file.

24. The apparatus of claim 16, wherein the means for generating the image indicator signal comprises means for sending the image indicator signal at an end of each still image; and the means for determining the compressed image data length comprises means for counting a number of bytes transferred into the buffer between first and second received image indicator signals.

25. The apparatus of claim 24, wherein the means for determining the compressed image data length further comprises means for determining a first location of a pointer in the buffer when the first image indicator signal is received and a second location of the pointer in the buffer when the second image indicator signal is received and for counting how many times the pointer has been through the buffer.

26. The apparatus of claim 10, wherein the means for generating the image indicator signal comprises means for sending the image indicator signal to a processing means; and the processing means comprises means for determining the length of the compressed image data as a function of the image indicator signal.

27. The apparatus of claim 26, wherein the buffer comprises means for outputting a location of a pointer in the buffer; and the means for determining the length of the compressed image data comprises means for determining the length of the compressed image data as a function of a value of the location of the pointer in the buffer when the image indicator signal is received by the processing means.

28. The apparatus of claim 10, wherein the means for generating the image indicator signal comprises means for sending an interrupt to a processing means at an end of every still image; and the processing means comprises means for counting a number of bytes transferred into the buffer since a previous interrupt was received.

29. The apparatus of claim 28, wherein the buffer comprises means for outputting a location of a pointer in the buffer; and the means for counting the number of bytes transferred into the buffer comprises means for determining a number of times the pointer moves through the buffer until receipt of a next interrupt.

30. An apparatus, for connection to a computer readable random access storage medium, for capturing motion video as compressed image data defining a sequence of computer-readable still images stored in a data file on the computer-readable random access medium, the apparatus comprising:

a compression processor having an input for receiving the motion video as a sequence of digitized still images defined by digital image information and for compressing the received digital image information of each digitized still image to provide corresponding compressed image data as an output;

a compressed data buffer having an input for receiving the compressed image data from the compression processor, a pointer output providing a value for a present location of a pointer in the compressed data buffer and an output providing the compressed image data for storage on the computer-readable random access medium; and a processor connected to receive an image indicator signal and the pointer output for each digitized still image and which provides as an output a determined length of the compressed image data corresponding to each digitized still image as a function of the image indicator signal and the pointer output.

31. The apparatus of claim 30, wherein the processor stores, for the compressed image data, the determined length of the corresponding compressed image data as an index to each compressed still image in the data file.

32. The apparatus as recited in claim 25, wherein the data file includes index data including an index of each still image in the data file, wherein the index includes the length of the compressed image data of each still image stored in the data file, the apparatus further comprising:

means for selecting a portion of the data file for use in a video program, wherein the portion has a first still image and a last still image, and wherein each still image has a beginning and an end in the data file; and means for storing, for the selected portion, a location of the beginning of the first still image and a location of the end of the last still image of the selected portion using the index.

* * * * *